(12) United States Patent
Clark et al.

(10) Patent No.: US 7,336,277 B1
(45) Date of Patent: Feb. 26, 2008

(54) PER-PIXEL OUTPUT LUMINOSITY COMPENSATION

(75) Inventors: Richard Clark, Kirkland, WA (US); David R. Morey, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 485 days.

(21) Appl. No.: 10/625,812

(22) Filed: Jul. 22, 2003

Related U.S. Application Data (60) Provisional application No. 60/463,759, filed on Apr. 17, 2003.

(51) Int. Cl.
*G06T 15/50* (2006.01)

(52) U.S. Cl. .................. 345/426; 345/1.2; 345/1.3; 345/20; 345/428; 345/582; 345/585; 345/589; 345/611; 345/629; 345/634; 345/647; 345/690; 382/154; 382/274; 348/746

(58) Field of Classification Search ........ 345/582–595, 345/629, 426, 634–640, 1.2, 20, 647; 382/274, 382/154
See application file for complete search history.

(56) References Cited

U.S. PATENT DOCUMENTS

| | | | |
|---|---|---|---|
| 4,974,073 A | 11/1990 | Inova | |
| 5,136,390 A | 8/1992 | Inova et al. | |
| 6,545,685 B1* | 4/2003 | Dorbie | 345/582 |
| 6,771,272 B2* | 8/2004 | Deering | 345/581 |

OTHER PUBLICATIONS

Green, Mark et al. *A New Computer Human Interface for Aligning and Edge Matching Multichannel Projector Systems* Society for Information Display International Symposium Digest of Technical Papers May 1988.

Holmes, Richard E. *Large Screen color CRT projection system with digital correction*, SPIE vol. 760 Large Screen Projection Displays 1987.

Lyon, Paul *Edge- Blending Multiple Projection Displays on a dome surface to form continuous wide angle fields-of-View*, InterService Industry Training Equipment Conference Proceedings, Nov. 19-21, 1995.

* cited by examiner

*Primary Examiner*—Kee M. Tung
*Assistant Examiner*—Antonio A Caschera
(74) *Attorney, Agent, or Firm*—Townsend and Townsend and Crew LLP (57) ABSTRACT

Per-pixel luminosity adjustment uses a luminosity mask applied as a texture. In one embodiment, a luminosity texture is defined. Pixel data of an underlying image is converted to an image texture. The image texture is blended onto a target surface. The luminosity texture is also blended onto the target surface, thereby generating luminosity compensated pixel data for the image.

40 Claims, 7 Drawing Sheets
(1 of 7 Drawing Sheet(s) Filed in Color)

PER-PIXEL OUTPUT LUMINOSITY COMPENSATION

CROSS-REFERENCES TO RELATED APPLICATIONS

The present disclosure is related to the following commonly-assigned now abandoned U.S. Patent Applications: No. 60/384,663, filed May 31, 2002, entitled "Method and Apparatus for Display Image Adjustment"; and 60/463,759, filed Apr. 17, 2003, entitled "Method and Apparatus for Display Image Adjustment". The respective disclosures of these applications are incorporated herein by reference for all purposes.

BACKGROUND OF THE INVENTION

The present invention relates generally to image generation and in particular to systems and methods for compensating output luminosity of an image on a pixel-by-pixel basis.

The appearance of an image displayed by a display device (e.g., a monitor or projection system) depends in part on environmental factors not inherent in the image generation system or the display device. For example, consider an image projected onto a screen by a projector. If the optical axis of the projector is not normal to the screen, the shape and brightness of resulting image will typically be distorted because one edge of the image is farther from the projector than the other: the image may be trapezoidal instead of rectangular, and areas of the image farther from the projector may be dimmer than areas closer to the projector. Such distortions commonly occur with tabletop projectors, where precise alignment with a screen is difficult to achieve.

As another example, ambient lighting can also affect the appearance of a displayed image. As is generally known, visibility of the displayed image is improved by increasing the brightness of the display device when the ambient lighting is strong and decreasing the brightness when the ambient lighting is dim. Many display devices provide a brightness control for making such adjustments. Ambient lighting, however, is not necessarily uniform over a surface on which the image is to be displayed. For example, a light source placed to one side of a display surface (e.g., monitor or screen) will illuminate one side of the surface more than the other. As another example, the ambient light may be partially occluded, creating shadows on part of the display surface. In such situations, portions of the image displayed on more dimly lit portions of the display surface generally appear to be brighter than other portions of the image. A standard brightness control does not address such nonuniformity, and changing the ambient lighting to uniformly illuminate the display device is not always practical.

Various techniques have been developed for addressing problems of nonuniform illumination. For instance, some existing projectors are equipped with corrective optics that can be used to equalize the effective optical path lengths of light directed at different areas of the screen and/or filters that can be inserted into the optical path to change the relative brightness of different sections of the displayed image. Such corrective optics, however, add considerably to the cost of the projector and are generally effective over only a limited range of misalignment angles. Some monitors also provide intensity adjustments to the analog signal, e.g., on a per-scanline basis. For instance, in a CRT monitor, the intensity of an electron beam can be modulated per scanline to reduce nonuniformity. This generally requires additional control circuits that increase complexity and cost of the devices.

It would therefore be desirable to correct the brightness of an image to account for nonuniformities in the display device and/or environmental factors in an economical and flexible manner.

BRIEF SUMMARY OF THE INVENTION

Embodiments of the present invention provide a per-pixel luminosity adjustment using a luminosity mask applied as a texture. According to one aspect of the invention, a method for generating pixel data for an image is provided. A luminosity texture having luminosity texels is defined. Pixel data of an underlying image is converted to an image texture having image texels. The image texture is blended onto a target surface having a shape. The luminosity texture is also blended onto the target surface, thereby generating luminosity compensated pixel data for the image. The luminosity compensated pixel data may be stored in a frame buffer and/or provided to a display device.

The target surface may include a polygon having vertices, and one or more of the vertices may be associated with one of the image texels of the image texture, and a user interface may be provided enabling the user to modify the shape of the target surface. In some embodiments, one or more of the luminosity texels is automatically updated in response to a user modification of the shape of the target surface. In other embodiments, a user interface is provided enabling a user to define the luminosity texture.

In some embodiments, each luminosity texel has a scaling factor, and blending the luminosity texture onto the target surface includes selecting a luminosity texel and multiplying a pixel value from the target surface by the scaling factor of the selected luminosity texel.

According to another aspect of the invention, a graphics processing system includes a texture generation module, a texture memory, and a multistage texture blending module. The texture generation module is configured to convert pixel data for an underlying image to an image texture having a plurality of image texels. The texture memory is configured to store the underlying image texture and a luminosity texture having a plurality of luminosity texels. The multistage texture blending module is configured to blend the image texture and the luminosity texture onto a target surface having a shape, thereby generating luminosity-compensated pixel data for an image.

The following detailed description together with the accompanying drawings will provide a better understanding of the nature and advantages of the present invention.

BRIEF DESCRIPTION OF THE DRAWINGS

The patent contains two drawings (FIGS. 8A and 8B) executed in color. Copies of this patent with color drawings will be provided by the Office upon request and payment of the necessary fee.

DETAILED DESCRIPTION OF THE INVENTION

Embodiments of the present invention provide a per-pixel luminosity adjustment using a luminosity mask applied as a texture to pixel data of an underlying image. This texture blending operation can be performed by a graphics processor and controlled by software so that no additional control circuitry or other hardware is required, thereby offering an economical solution to problems of nonuniform illumination. Luminosity compensation according to the present invention is not limited to correcting for nonuniform illumination. A wide array of other effects can also be created using systems and methods described herein.

Figure 1:
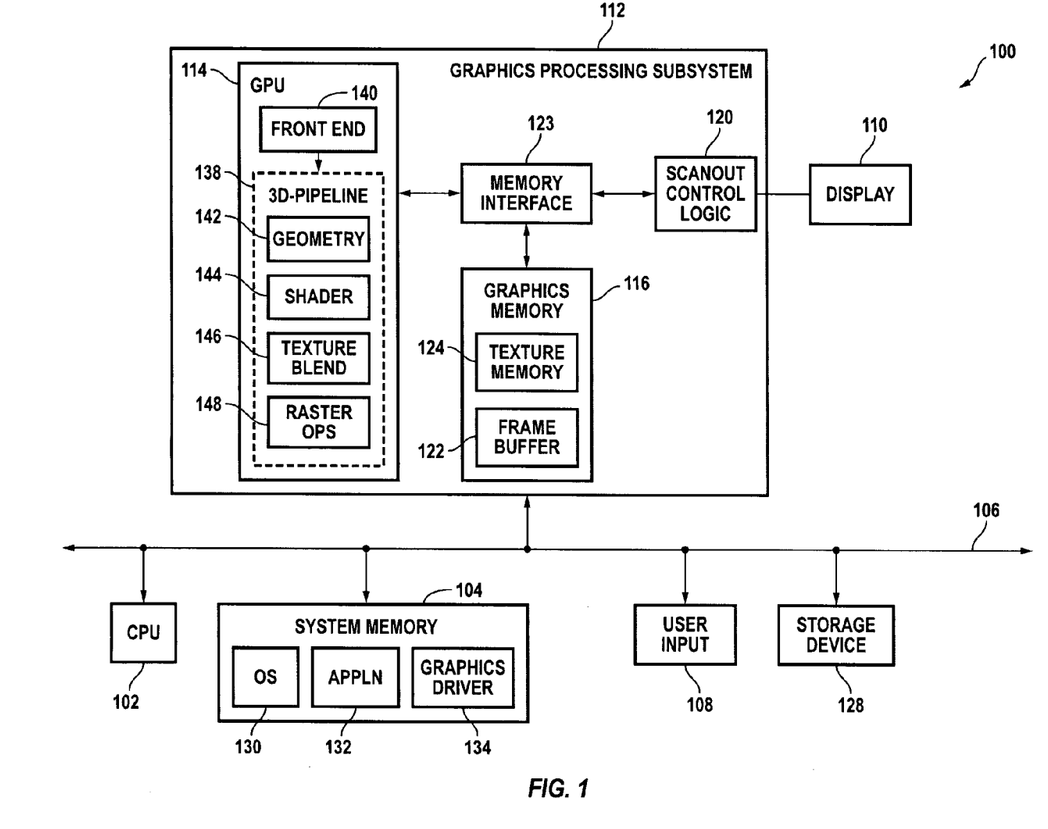
FIG. 1 is a block diagram of a computer system according to an embodiment of the present invention.

FIG. 1 is a simplified block diagram of a computer system 100 according to an embodiment of the present invention. Computer system 100 includes a central processing unit (CPU) 102 and a system (or main) memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor, projector, etc.) operating under control of a graphics processing subsystem 112 coupled to bus 106. Other components, such as one or more storage devices 128 (e.g., a fixed or removable magnetic disk drive, compact disk (CD) drive, and/or DVD drive), may also be coupled to system bus 106.

Graphics processing subsystem 112 includes a graphics processing unit (GPU) 114, a graphics memory 116, and scanout control logic 120, which may be implemented, e.g., using one or more integrated circuit devices. Graphics memory 116 includes a frame buffer 122 and a texture memory 124. Frame buffer 122 stores pixel data to be read by scanout control logic 120 and transmitted to display device 110 for display as an image. Texture memory 124 stores data for one or more textures to be used during generation of pixel data, as will be described further below. Frame buffer 122 and texture memory 124 may be implemented using distinct memory devices or physically or logically distinct portions of a single memory device. A memory interface 123 is advantageously provided to manage communication between graphics memory 116 and other system components. Memory interface 123 may be integrated with graphics memory 116 or provided as a separate integrated circuit device.

GPU 114 includes various components for receiving and processing graphics system commands received via bus 106. In one embodiment, GPU 114 includes a front end module 140 and a three-dimensional (3-D) processing pipeline 138 for rendering images—i.e., generating pixel data to be displayed on display device 110—from 3-D graphics data (e.g., geometry data including polygons and related data describing a scene) received via bus 106. In some embodiments, GPU 114 may also include a separate two-dimensional (2-D) processing pipeline (not shown) for rendering images using 2-D graphics data received from CPU 102.

In operation, CPU 102 executes one or more operating system programs 130 and/or application programs 132, which may be of conventional design. An application program 132 may be, for instance, a video game program that generates 3-D graphics data and invokes appropriate rendering functions of GPU 114 to transform the graphics data to pixel data. Another application program 132 may generate pixel data and provide the pixel data to graphics processing subsystem 112 for display. It is to be understood that any number of application programs producing pixel and/or graphics data may be executing concurrently on CPU 102. An operating system program 130 (e.g., the Graphical Device Interface (GDI) component of the Microsoft Windows operating system) may also generate pixel and/or graphics data to be processed by graphics processing subsystem 112.

CPU 102 also executes a graphics driver program 134 that enables communication with graphics processing subsystem 112. Graphics driver program 134 advantageously implements one or more standard application program interfaces (APIs), such as Open GL, Microsoft DirectX, or D3D for communication with graphics processing subsystem 112; any number or combination of APIs may be supported. By invoking appropriate API function calls, operating system programs 130 and/or application programs 132 are able to instruct graphics driver program 134 to transfer graphics data or pixel data to graphics processing subsystem 112 via system bus 106, to invoke various rendering functions of GPU 114, and so on. Data transfer operations may be performed using conventional DMA (direct memory access) or other operations. The specific commands transmitted to graphics processing subsystem 112 by graphics driver 134 in response to an API function call may vary depending on the implementation of GPU 114, and these commands may include commands implementing additional functionality (e.g., special visual effects) not controlled by operating system programs 130 or application programs 132.

It is to be understood that, although operating system programs 130, application programs 132, and graphics driver 134 are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory-mapped file on a system disk, and/or in other storage space.

When GPU 114 receives commands via system bus 106, the commands are processed by front end module 140, which directs the operation of various processing modules (e.g., components of processing pipeline 138) to create pixel data to be stored in frame buffer 122 and/or texture data to be stored in texture memory 124.

The 3-D pipeline 138 is used for image rendering. Pipeline 138 contains various processing modules—such as a geometry processing module 142, a shader 144, a texture blending module 146, and a raster operations module 148—that are usable to convert 3-D graphics data into pixel data suitable for displaying on display device 110. In one embodiment, 3-D pipeline 138 is controllable by application programs invoking API functions supported by graphics driver 134 as described above.

Geometry processing module 142 performs setup and transformation operations on received graphics data. These operations may include lighting transforms, coordinate transforms to a viewing space defined by image plane (x, y) and depth (z) coordinates, culling of unseen polygons (e.g., back facing polygons and/or polygons located entirely outside the viewable region), clipping of unseen portions of polygons, and the like. Any kind of transformation or other manipulation of the graphics data can be implemented; numerous examples are known in the art.

Shader 144 computes one or more shading values per pixel from the graphics data after transformation to viewing space. Shader 144 may implement conventional rasterization techniques including scan-conversion and depth buffering, and a variety of shading algorithms, e.g., flat shading, Gouraud shading, or Phong shading, as well as other processes. In one embodiment, shader 144 is a programmable shader that generates a shading value for a pixel by executing program instructions provided with the graphics data.

Texture blending module 146 performs texture blending operations to combine the shading value generated by shader 144 with texture data stored in texture memory 124. In one embodiment, texture data is stored in the form of "texels" (or texture elements), each of which has a color value corresponding to a different portion of the texture. Each texel is associated with a set of texture coordinates (commonly denoted as (u, v) in the case of two-dimensional textures), and texture coordinates may be associated with vertices of polygons in the graphics data.

Texture blending involves selecting one or more texels that correspond to a given pixel and combining the selected texel value(s) with the shading value determined by shader 144. For instance, where a texture coordinate is associated with each vertex of a polygon, texture coordinates for any pixel within the polygon can be determined by interpolating between the texture coordinates of the vertices. One or more texels are then selected based on the texture coordinates of the pixel. Numerous techniques for associating texels and pixels with texture coordinates are known in the art and may be used by texture module 146.

Once the appropriate texel(s) has (have) been selected, texture blending module 146 may perform various texture blending algorithms, including nearest-neighbor filtering, bilinear interpolation, trilinear interpolation, and anisotropic filtering. Examples of such algorithms are known in the art, and texture module 146 may be configurable to use any texture-blending algorithm.

Texture blending module 146 is advantageously implemented to support a number (e.g., up to eight) of texture blending stages during image generation. At each stage, one texture is applied to the image data using a selected texture blending algorithm; thus, multiple textures may be applied to the same image, and different textures may be applied using different algorithms. In accordance with an embodiment of the present invention, one of the texture blending stages is used to apply a luminosity mask that has been stored as a texture, as described further below, thereby adjusting the luminosity (or brightness) of the displayed image on a per-pixel basis. Multistage texture blending can be controlled by graphics driver 134 and/or an application program 132 using an API that supports concurrent configuration of multiple texture blending stages, such as the Microsoft DirectX API (version 8 or later).

Texture data for one or more texture blending stages may be provided to texture memory 124 in various ways. For instance, CPU 102 may generate texture data and provide it to texture memory 124 via a DMA operation. As another example, pixel data created by 3-D pipeline 138 may be stored as texture data in texture memory 124 for use as a texture in another image. In some embodiments, a texture may be provided as a MIP-map constructed by providing successive sets of texels corresponding to different levels of detail, as is known in the art. MIP-maps may be used in conjunction with various filtering operations performed by texture blend module 146 to further the illusion of depth.

Raster operations module 148 performs further operations on the pixel data. In some embodiments, these operations may include blending multiple shading samples to produce a single color value for each pixel of display device 110, rendering shadow volumes, and applying alpha transparency Numerous examples of operations that may be implemented in raster operations module 148 are known in the art. After all such operations, final pixel data for an image is written to frame buffer 122 of graphics memory 116.

Pixel data in frame buffer 122 is scanned out by scanout control logic 120 and displayed on display device 110. In one embodiment, scanout occurs at a constant refresh rate (e.g., 80 Hz); the refresh rate can be a user selectable parameter. Scanout control logic 120 may also perform other operations such as adjustment of color values, generating composite screen images by combining pixel data from frame buffer 122 with data for a video or cursor overlay image or the like obtained from graphics memory 116 or another data source (not shown), digital to analog conversion, and so on.

It will be appreciated that system 100 is illustrative and that variations and modifications are possible. The display device can be any pixel-based display, e.g., a CRT or LCD monitor, projector, printer, etc. In some instances, multiple display devices (e.g., an array of projectors or CRT monitors) may be supported, with each device displaying a portion of the image data. GPU 114 may implement various pipelines for processing 3-D and/or 2-D graphics data, and numerous techniques may be used to support data transfers between system memory 104 and graphics memory 116. GPU 114 or any of its components may be implemented using one or more programmable processors programmed with appropriate software, application specific integrated circuits (ASICs), other integrated circuit technologies, or any combination of these. Graphics memory 116 may be implemented using one or more memory devices. Memory interface 123 may be integrated with graphics memory 123 and/or GPU 114, or implemented in one or more separate devices, e.g., ASICs. Scanout control logic 120 may be implemented in the same device (e.g., programmable processor) as GPU 114 or a different device. In view of the present disclosure, persons of ordinary skill in the art will recognize that the present invention can be embodied in a wide variety of system configurations.

In accordance with an embodiment of the present invention, texture processor 146 applies a luminosity mask as a texture to an underlying image, thereby adjusting the luminosity (or brightness) of a displayed image on a per-pixel basis. The underlying image may include desktop data (provided, e.g., via the Microsoft Windows GDI component), an overlay (e.g., a frame of video data or a cursor), pixel data generated by 3-D pipeline 138, and so on. The luminosity mask is used to determine a per-pixel adjustment to the luminosity, e.g., to brighten or darken selected pixels or groups of pixels. In some embodiments, the luminosity mask provides a bitmap that specifies a scaling factor (f) for each pixel; the color value (c) for a pixel is multiplied by the appropriate scaling factor f to determine a luminosity-compensated pixel value (L). That is, L=c*f, where f=0 forces the pixel to a dark state and f=1 leaves the underlying pixel color unaltered. It should be noted that in some embodiments, f>1 is also allowed, although such values may cause pixel luminosity to saturate (e.g., pixels may become pure white), washing out all or part of the image. By defining an appropriate luminosity mask (e.g., a bitmap containing a scaling factor f for each pixel), various effects can be provided, including but not limited to compensation for apparent nonuniformity in the brightness of a displayed image. Specific examples of these effects are described below.

Figure 2:
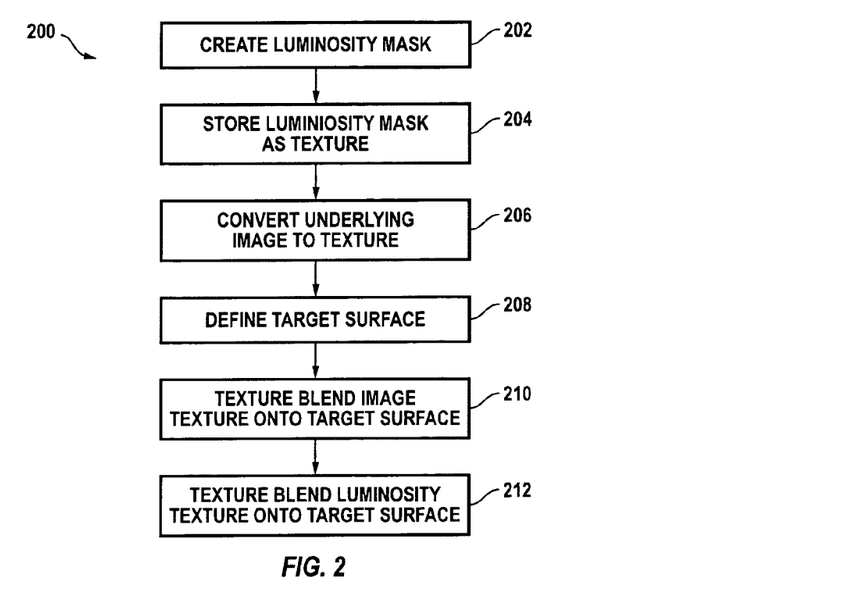
FIG. 2 is a flow diagram of a process for adjusting luminosity on a per-pixel basis according to an embodiment of the present invention.

FIG. 2 is a flow diagram of a process 200 for applying a luminosity mask according to an embodiment of the present invention. Process 200, which can be performed using system 100 of FIG. 1 or other system configurations, involves providing a luminosity mask as a texture, then blending an underlying image with the luminosity texture.

More specifically, at step 202, a luminosity mask is defined. As described further below, the luminosity mask may be preprogrammed, read from a file, dynamically generated, or configured by a user. At step 204, the luminosity mask is stored as a texture (e.g., in texture memory 124 of FIG. 1).

At step 206, pixel data for the underlying image is converted to a texture (referred to herein as an "image texture") so that texture blending operations can be performed. Each texel of the image texture advantageously corresponds to a pixel of the underlying image. In some embodiments, the underlying image includes pixel data from frame buffer 122, and converting the underlying image to a texture involves copying the pixel data from the frame buffer to the texture memory. In other embodiments, the conversion is done by simply accessing the pixel data stored in the frame buffer as a texture. This can be done, e.g., by changing values stored in one or more registers of GPU 114 that identify a memory region where texture data is stored.

In another embodiment, the underlying image may also include an overlay image (e.g., a cursor or a frame of a movie provided by a DVD player or other video data source). To include the overlay in the image texture, the overlay data may be block transferred to the appropriate section of the frame buffer or texture memory that stores the underlying image data, either before or after conversion of the underlying image data to a texture. Alternatively, the overlay data may be stored as a separate texture that is applied during a separate texture blending stage, either before or after the luminosity mask is applied. It should be noted that applying an overlay texture after the luminosity mask may result in the overlay not being affected by the luminosity adjustment.

At step 208, a target surface is defined in two or three dimensions, e.g., using one or more polygons. In one embodiment, the target surface is a rectangle (or two triangles) corresponding to the dimensions of the display area (e.g., 1024×768 pixels); if the target surface is three dimensional, the depth coordinate may be set to a constant value (e.g., zero). More generally, the target surface can be defined using a polygon mesh made up of any number of triangles or other polygons. Defining the target surface advantageously includes establishing a mapping between selected points of the target surface (e.g., vertices of polygons) and selected texture coordinates or texels of the image texture. The target surface may be assigned a color value, such as solid black (or other solid color); in some embodiments, the color of the target surface plays no role in generating the final image.

At step 210, the image texture is texture-blended onto the target surface. This texture blending step advantageously uses a blending algorithm that determines the appropriate pixel color from the texel(s) without mixing in the pixel color of the target surface, thereby allowing the underlying image to be displayed without distortion in the event that the target surface corresponds to the dimensions of the viewable area.

At step 212, the luminosity texture is blended onto the target surface. In one embodiment, the luminosity texture contains a texel corresponding to each screen pixel, and selecting a texel from the luminosity mask to blend with a given pixel is straightforward. Where the luminosity texture provides a scaling factor f for each texel, as described above, texture blending step 212 may implement a "modulate" filter that multiplies the color value of the pixel by the luminosity texel value for the pixel. Other texture blending operations, including different selection of texels from the luminosity mask, may also be implemented. For example, the vertices of polygons defining the target surface may be associated with selected texture coordinates or texels of the luminosity texture, and interpolation techniques may be used to select one or more texels for blending with each pixel. The luminosity compensated pixel data may be stored in frame buffer 122, where it may be scanned out and displayed.

It will be appreciated that the process described herein is illustrative and that variations and modifications are possible. Steps described as sequential may be executed in parallel, order of steps may be varied, and steps may be modified or combined. Process 200 is advantageously implemented in a system environment that supports multi-stage texture blending (e.g., via the DirectX version 8 API). Where multistage texture blending is supported, the image texture can be selected for texture blending at one stage while the luminosity texture is selected at another stage; other texture blending stages may also be implemented, preceding and/or following the image and luminosity texture blending stages. In some embodiments, the image and luminosity texture blending stages may each be enabled or disabled independently.

The order of applying the image and luminosity textures may also be reversed. For instance, the luminosity map may be applied to the target surface first, using a texture blending algorithm that determines the appropriate pixel color from the texel(s) without mixing in the pixel color of the target surface. This can be followed by a texture blending stage that applies the image texture using a modulate filter.

As noted above, process 200 may be implemented in system 100 of FIG. 1. In one embodiment, process 200 is implemented using a 3-D graphics application program 132 executing on CPU 102 and invoking API functions of graphics driver 134 to perform the steps described above. This application program uses image data generated by other programs as the underlying image. The application program may also provide additional features, such as a user interface for customizing luminosity textures, controlling whether luminosity adjustment is applied or not, and the like; it may also support other visual effects in addition to luminosity adjustment. Alternatively, process 200 may be implemented within graphics driver program 134, e.g., as part of its processing of an image updating command. In this embodiment, a driver interface component may be provided to enable a user to control luminosity adjustment. It will be appreciated that process 200 may also be implemented in other system configurations.

Examples of the use of luminosity masks (or luminosity textures) to provide brightness compensation and various other effects will now be described. Persons of ordinary skill in the art will recognize that the present invention is not limited to use of luminosity textures for any particular effect.

Figure 3A:
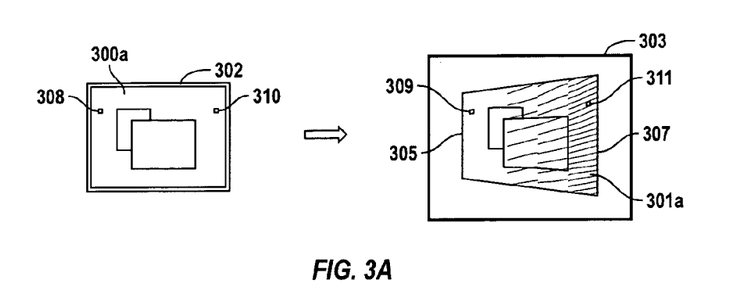
FIGS. 3A-E are illustrations of displayed images according to an embodiment of the present invention.

In one embodiment, a luminosity mask is advantageously used when an image is to be projected onto a screen or other surface. If the optical axis of the projector is not normal to the screen (or other surface) onto which an image is projected, various distortions generally occur, as illustrated in FIG. 3A. Image 300a is an image displayed on a monitor 302, and image 301a is a corresponding image projected onto a screen 303 by a projector (not shown) whose optical axis is not normal to screen 303. It is to be understood that images 300a and 301a are generated from the same pixel data and that a system may be configured to produce either or both of these images. In this example, the projector is positioned such that light illuminating the left-hand edge 305 of image 301a travels a shorter distance than light illuminating the right-hand edge 307. Because the light beam from the projector expands as it travels, left-hand edge 305 of projected image 301a is shorter than right-hand edge 307, so that image 301a is non-rectangular. This effect is referred to as "keystone" distortion. In addition, because the concentration of photons decreases as the light beam expands, the brightness of image 301a is nonuniform, as indicated by the density of hatching in image 301a. For example, pixels 308 and 310 of image 300a have the same color value and are indistinguishable on monitor 302. In image 301a, pixel 309 (corresponding to pixel 308) appears to be brighter than pixel 311 (corresponding to pixel 310) because the concentration of photons is higher at pixel 309 than at pixel 311.

In one embodiment of the present invention, a projected image such as image 301a is corrected for both keystone distortion and nonuniform brightness. Examples of techniques for adjusting the image shape to compensate for keystone distortion are described in detail in the above cross-referenced application No. 60/384,663. In one example described therein, the underlying image (including, e.g., desktop and/or other data) is converted to an image texture that is blended onto a target surface, similarly to steps 206, 208, and 210 of process 200 described above. Initially, the target surface corresponds to the dimensions of the viewable area. A user can adjust the shape of the projected image by modifying the target surface.

Figure 3B:
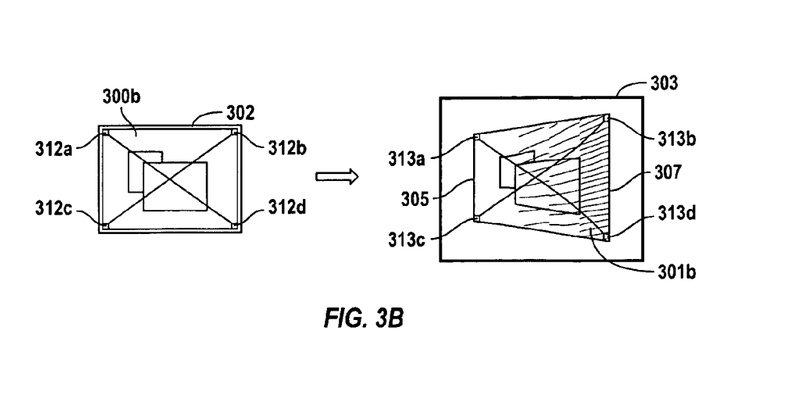

An embodiment of a user interface for modifying the target surface is illustrated in FIG. 3B. Image 300b on monitor 302 corresponds to image 300a of FIG. 3A, with the addition of a user interface including various movement handles 312a-d. (A corresponding projected image 301b on screen 303, with handles labeled 313a-d, is also shown.) A user can move each of onscreen handles 312a-d (or the projected handles 313a-d) independently, e.g., by using a mouse to click and drag any one of the handles 312a-d, thereby changing the shape of the target surface. In one embodiment, when a user repositions one of handles 312a-d, the apparent handle position in the image (x, y) plane is used to compute a new depth (z) coordinate for the corresponding vertex of the target surface, rather than modifying the (x, y) coordinates of the vertex. The change in shape of the displayed surface results from a perspective projection of the three-dimensional target surface onto the image plane. As the target surface changes, the corners and/or other selected locations of the surface remain mapped to corresponding coordinates of the image texture, and the shape of the desktop image as displayed is determined by the target surface.

Figure 3C:
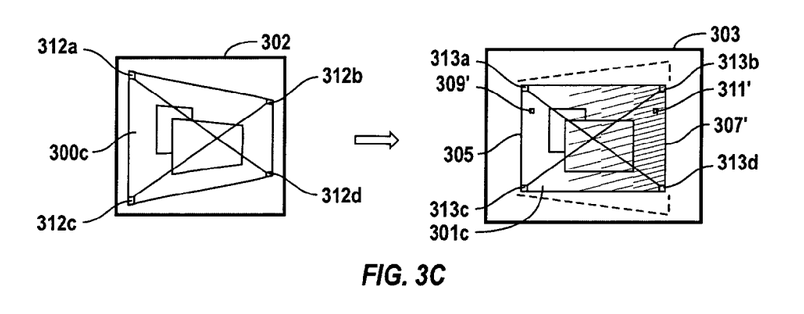

For example, a user may move projected handles 313b and 313d to shorten right-hand edge 307 of image 301b to match the length of left-hand edge 305. FIG. 3C shows image 300c on monitor 302, which corresponds to image 300b of FIG. 3B after this adjustment, as well as a corresponding image 301c projected onto screen 303. Edges 307' and 305 of projected image 301c are the same length, so that image 301c is substantially rectangular. Image 300c on monitor 302 is not rectangular, reflecting that the image texture is mapped onto a non-rectangular target surface.

Figure 3D:
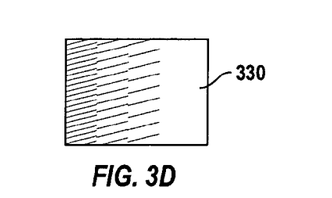

Image 301c in FIG. 3C is substantially rectangular, but the right-hand side of image 301c is generally darker than the left-hand side (e.g., pixel 309' may appear brighter than pixel 311'). To correct for this effect in accordance with an embodiment of the present invention, a luminosity mask, such as mask 330 shown in FIG. 3D, is applied, e.g., using a separate texture-blending operation in accordance with process 200. Mask 330 defines a scaling factor f for each pixel such that a pixel farthest from the projector has f=1 and pixels closer to the projector have smaller values of f.

In some embodiments, per-pixel values for luminosity mask 330 can be automatically computed based on the shape of the target surface. For example, when the target surface is modified by adjusting z coordinate of its vertices as described above, the z coordinates of different vertices reflect which parts of the screen (or other surface) are closer to the projector. In one embodiment, the scaling factor f for a particular pixel is computed using $f=z*K$, where K is a constant selected such that the resulting scale factor f is larger for values of z corresponding to larger distances between the projector and screen. Other computations, e.g., based on various representations of the decrease of light intensity with distance, may also be applied. In other embodiments, luminosity mask 330 may be manually defined or adjusted by a user, as described below.

Figure 3E:
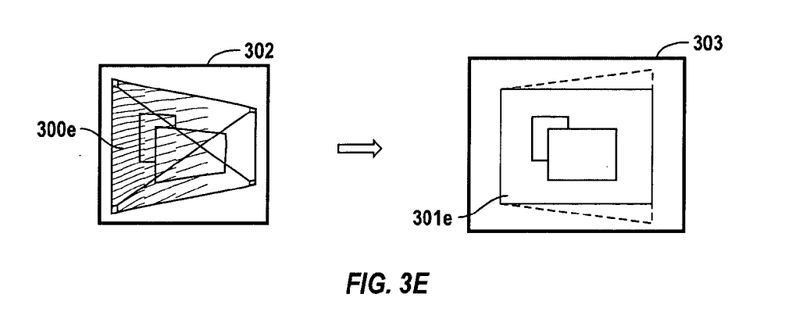

Applying luminosity mask 330 reduces the brightness of the nearer pixels so that the effect of the off axis projector on the projected image is reduced. FIG. 3E shows the result of applying luminosity mask 330 of FIG. 3D to images 300c and 301c. Image 300e on monitor 302 is generally darker at the left hand side due to luminosity mask 330. Image 301e on screen 303 is uniformly bright.

Figure 4:
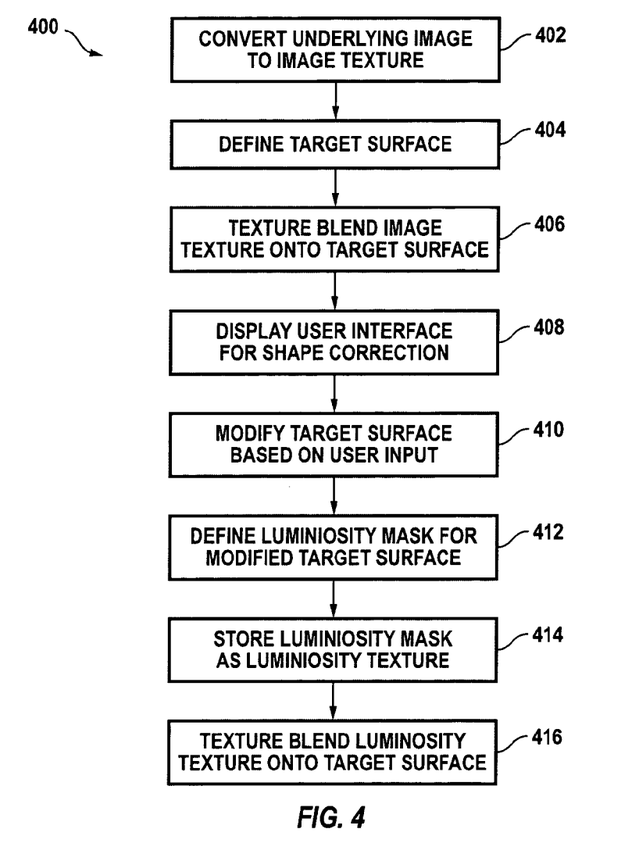
FIG. 4 is a flow diagram of a process for adjusting luminosity and shape of an image according to an embodiment of the present invention.

FIG. 4 is a flow chart of a process 400 for performing keystone correction and luminosity compensation for off-axis projection of an image in accordance with an embodiment of the present invention. At step 402, the underlying image is converted to an image texture. Step 402 may be generally similar to step 206 of process 200 described above.

At step 404 a target surface is defined, e.g., using one or more polygons, similarly to step 208 of process 200 described above. In one embodiment, the target surface is defined using a polygon mesh. For projection onto a flat screen, a rectangle or as few as two triangles may be used; larger numbers of polygons may advantageously be used to support projection onto a non-flat surface, e.g., into a corner or onto a cylindrical, spherical, or other curved surface. Specific examples of polygon meshes suitable for such surfaces are described in the above-mentioned application No. 60/384,663. As described above, defining the target surface advantageously includes establishing a mapping between selected points (e.g., vertices of polygons) of the target surface and selected texture coordinates or texels of the image texture. The target surface may be assigned a color value, such as solid black (or other solid color). At step 406, the image texture is texture-blended onto the target surface. This step may be implemented similarly to step 210 of process 200.

At step 408, a user interface is displayed, enabling the user to modify the shape of the target surface to correct for keystone distortion. In one embodiment, the user interface includes a set of movement handles as illustrated in FIG. 3B and described above. The handles advantageously correspond to some or all of the vertices of the polygon or polygon mesh used to define the target surface. The user interface is advantageously activated and deactivated in response to appropriate user input. For instance, a user may be able to toggle the interface on and off by pressing a designated key or sequence of keys, by choosing an item from an on-screen pop-up menu, and so on. Further details and examples related to the user interface may be found in the above-referenced application No. 60/384,663.

At step 410, user input is received and the shape of the target surface is modified based on the user input. For instance, as described above with reference to FIGS. 3B and 3C, the user may click and drag one or more of the handles to reposition one or more vertices of a polygon mesh. The coordinates of a vertex corresponding to the dragged handle are updated, so that the displayed image in subsequent frames will have a different shape. By making such adjustments, a user may compensate for an undesired keystone distortion in a projected image or introduce a desired distortion into an image.

At step 412, a luminosity mask (e.g., mask 330 of FIG. 3D) is determined. In one embodiment, the luminosity mask is automatically computed based on the shape of the target surface. For example, if the target surface is rectangular, the luminosity mask may default to a uniform mask (e.g., scaling factor $f=1$ for all pixels); if the target surface is modified as in FIG. 3C above, the lengths of opposite edges and/or diagonals can be compared to determine which edge is closer to the projector and by how much; an appropriate gradation of scaling factor f can then be computed so that the most distant pixel has scale factor $f=1$ (i.e., full luminosity) while nearer pixels have their luminosity scaled down appropriately to produce a more uniformly bright image. For instance, the computation $f=z*K$ as described above may be applied to compute the luminosity mask; other formulas may also be used. In another embodiment, the luminosity mask is manually adjusted by a user via an appropriate user interface, examples of which are described below.

At step 414, the luminosity mask is stored as a texture, and at step 416, the luminosity texture is blended onto the target surface. These steps may be implemented similarly to steps 204 and 212 of process 200 described above.

It is to be understood that process 400 may be executed iteratively, with a succession of user inputs being received to modify the target surface and an updated luminosity mask being defined in response to each successive input. Concurrently with these actions, updated data for the underlying image may be received and included in the image texture.

It will be appreciated that the process described herein is illustrative and that variations and modifications are possible. Steps described as sequential may be executed in parallel, order of steps may be varied, and steps may be modified or combined. For example, shape correction may be done without luminosity compensation, and/or luminosity compensation may be done without shape correction. The luminosity masks and texture blending steps described herein may also be employed in conjunction with other techniques for keystone (shape) adjustment, numerous examples of which are described in the above cross-referenced patent application No. 60/384,663.

Figure 5:
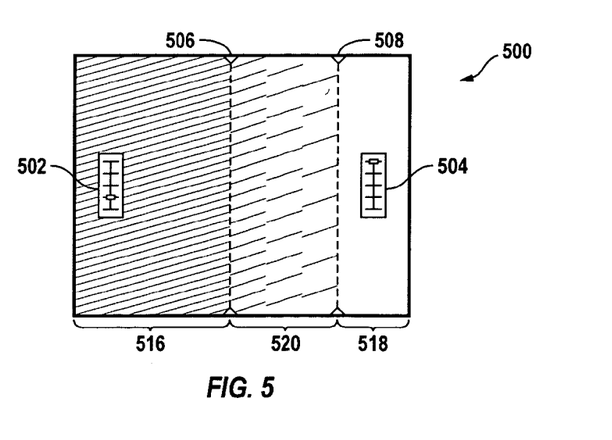
FIG. 5 is an illustration of a user interface for adjusting luminosity according to an embodiment of the present invention.

As mentioned above, in some embodiments, the luminosity mask can be adjusted or configured manually by the user. A user interface is advantageously provided for this purpose, and such an interface may be implemented in numerous ways. For example, FIG. 5 illustrates one embodiment of a graphical user interface for defining a luminosity mask with a gradient in the horizontal direction extending across all or part of the display area. A displayed image 500 includes graphical controls that may be displayed over a solid-color screen, desktop, or other image. The luminosity mask is advantageously updated and applied to displayed image 500 as the user manipulates the controls in order to provide immediate feedback on the effect of a particular setting.

In this embodiment, the graphical controls include a left-side luminosity adjustment control 502, a right-side luminosity adjustment control 504, and a transition region start marker 506 and stop marker 508 that together define a transition region 520. Left-side (right-side) luminosity control 502 (504) may be implemented using a slider bar, dial, or other graphical control in which the user positions a control element to select the desired scale factor (or other parameter), e.g., by using a mouse to click and drag the control element. Thus, a user may select a first scaling factor for the section 516 of the display to the left of transition region start marker 506 by adjusting control 502, and select a second scaling factor for the section 518 of the display to the right of transition region stop marker 508 by adjusting control 504. Controls 502 and 504 are advantageously made independent of each other, so that either side of the luminosity mask can be made brighter than the other or both sides can have the same brightness level applied.

Transition region 520 includes the area between transition region start marker 506 and transition region stop marker 508. In this region, interpolation is used to generate a smooth transition of the scale factor from the value at the left hand side to the value at the right hand side. Interpolation may be linear or nonlinear; in some embodiments, a user is able to select an interpolation function via another control (not shown), such as a menu selection. Transition region start marker 506 and stop marker 508 are advantageously made adjustable; e.g., a user may use a mouse to click and drag either marker to reposition it, thereby changing the location and/or width of the transition region. In one embodiment, the transition region can be as small as zero pixels (an abrupt change) or as wide as the entire display 500. It will be appreciated that a similar user interface may be provided for defining a luminosity mask with a gradient in the vertical direction.

Other user interfaces may also be provided. For instance, a user interface may enable a user to select a luminosity scaling factor for each of a number of screen pixels ("set points"). Interpolation or other curve-fitting techniques are used to determine the scaling factor for other locations on the screen. Any number of set points in any arrangement may be implemented, and in some embodiments, the user may be able to define the number and arrangement of set points.

In yet another embodiment, one or more dialog boxes may be provided for the user to enter values for various parameters describing a luminosity mask, such as scaling factors associated with various user-selected or predefined set points or regions, and/or locations and widths of one or more transition regions. User interfaces may also combine click-and-drag and dialog-box elements, e.g., allowing a user to click at a screen location to define a set point and then type in a scaling factor for the set point. Or a user may be able to define a luminosity mask using a graphical user interface and then call up a dialog box to refine the definition. Those of ordinary skill in the art will recognize that a wide variety of other interfaces may also be used.

In some embodiments, the user interface provides a control enabling the user to store a luminosity mask as a bitmap file on a disk or other non-volatile storage device and/or to select a luminosity mask that has previously been stored as a bitmap file to be used as the luminosity texture. Thus, a user can create a luminosity mask using any of the user interfaces described above or any application program that supports creation of bitmap files, save the mask to a file, and then apply the mask by selecting the saved file. Other file formats may be supported in addition to or instead of bitmap files.

In a further embodiment of the present invention, a luminosity mask is used to reduce visible seams between sections of a composite image. In this embodiment, an array of display devices (e.g., projectors or CRT monitors) is set up and used to display an image, with each device displaying a portion of the image. Examples of such systems are described in detail in the above-referenced application No. 60/463,759. These systems include various features for synchronizing and aligning devices that display different portions of the image; such features are not crucial to understanding the present invention, and a detailed description is omitted.

Figure 6:
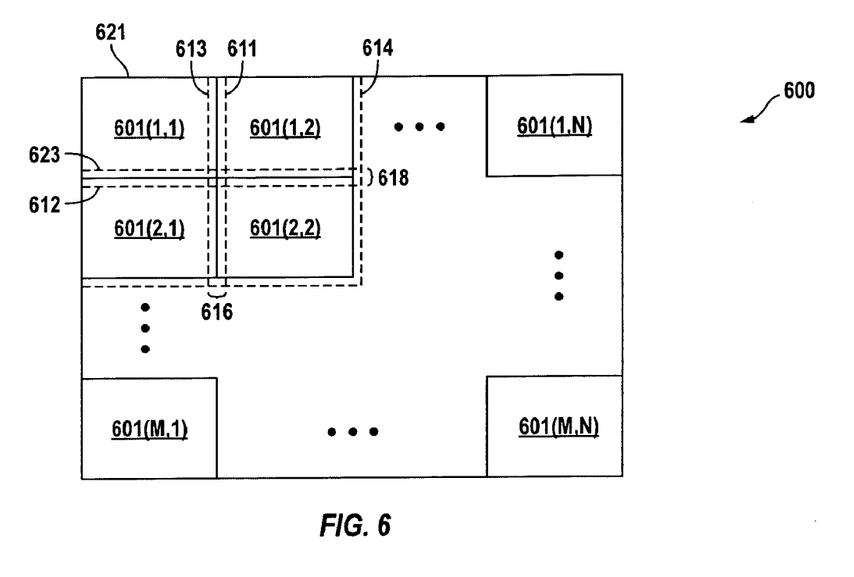
FIG. 6 is an illustration of an image displayed using an array of projectors.

FIG. 6 shows an example of an image 600 displayed by an array of M by N projectors (not shown), each of which projects a corresponding element (or portion) 601($i,j$) of the image 600, where $1 \leq i \leq M$ and $1 \leq j \leq N$. At least one of M and N is greater than 1; the other of M and N may be equal to 1 or greater than 1. To reduce or eliminate perceptible gaps between adjacent image elements, e.g., elements 601(1,1) and 601(1,2), it is useful to have the projectors display overlapping sections of the image. For instance, the projector that displays image element 601(1,1) may display all pixels in a rectangle defined by top edge 621, left edge 623, horizontal dashed line 612, and vertical dashed line 611. Similarly, the projector that displays image element 601(1,2) may display all pixels in a rectangle defined by top edge 621, horizontal dashed line 612, and vertical dashed lines 613 and 614. Thus, overlap regions such as regions 616 and 618 are created. An overlap region may exist anywhere two or more image elements form a seam. The size of the overlap regions may be user-adjustable, as described in the above-referenced application No. 60/463,759.

Figure 7:
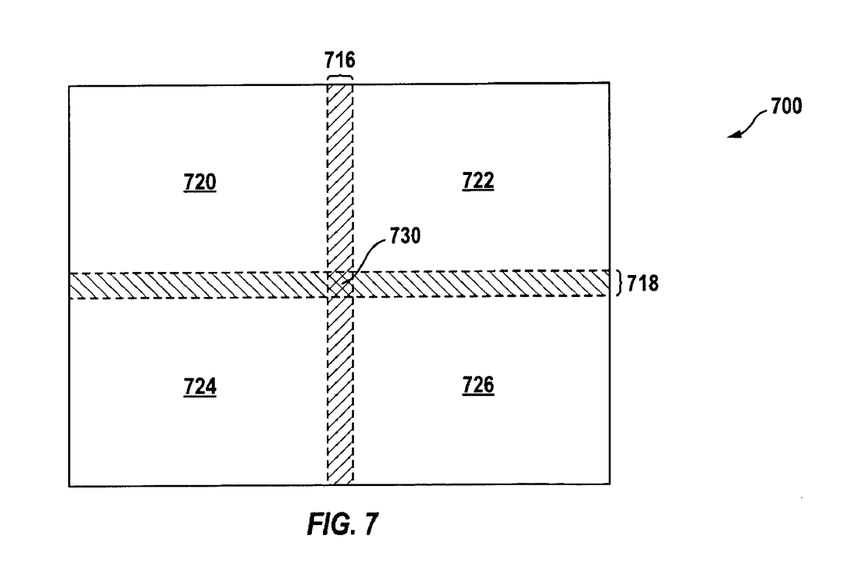
FIG. 7 is an illustration of a luminosity mask for an image displayed using an array of projectors according to an embodiment of the present invention.

Within overlap regions 616, 618, two (or more) projectors display the same pixel at approximately the same screen location. Such regions will tend to be brighter than regions illuminated by only one projector, so that seams between image elements appear as conspicuously bright lines. To reduce the visibility of the seams, image 600 may be modified by applying a luminosity mask or texture that darkens pixels in the overlap regions. FIG. 7 shows an example of a luminosity mask 700 for a two-by-two array of projectors (M=N=2). Overlap regions 716 and 718 are defined as horizontal and vertical stripes, which may be one or more pixels wide. Outside overlap regions 716 and 718, i.e., in regions 720, 722, 724, 726, the scale factor is f=1. Inside regions 716 and 718, the scale factor is smaller. For instance, if region 716 is apparently twice as bright (due to two projectors illuminating it), a scale factor of f=0.5 may be used. It will be appreciated that the scale factor may be optimized for a particular implementation and that optimal values will depend on conditions such as the uniformity of illumination provided by different projectors and how closely pixels produced by adjacent projectors are aligned in the displayed image. For example, in one embodiment, where small misalignments are present, a scale factor of about 0.55 may be optimal.

Mask 700 also includes a region 730 in which four projectors contribute to the apparent brightness of the image. It may be desirable to use an even lower scaling factor for pixels in region 730 than in the rest of overlap regions 716, 718, to further reduce the visibility of a seam.

It will be appreciated that mask 700 may be modified for different numbers and/or arrangements of projectors, and to account for different sizes of the overlap regions. Accordingly, a user interface similar to any of those described above may be provided to enable a user to create or modify mask 700. The scaling factors inside and/or outside overlap regions may be user-adjustable, and smooth transitions across the boundary between regions 716, 718 and regions 720, 722, 724, 726 may be provided. In addition, some projectors in an array may be inherently brighter than others; scaling factors in regions 720, 722, 724, 726 may be adjusted independently to compensate for such variations.

Keystone correction techniques (e.g., as described above) may also be employed for individual projectors in the array and/or the array as a whole to further reduce the appearance of seams in the projected image. In an alternative embodiment, a separate luminosity mask is provided for each projector in the array and applied to the appropriate portion of the image data.

In another embodiment of a multiple display system, an array of CRT monitors may be used to create an image, with an element (or portion) of the image being displayed on each monitor. In this embodiment, the image elements do not overlap. However, image quality may still be affected by variations in performance between different CRT monitors and by effects such as intensity roll-off, which can make pixels near the edge of a CRT appear dimmer than pixels near the center. Luminosity masks or textures can be created to compensate for such effects in a particular CRT array and applied to an image (or any section thereof), thereby making the image look more uniform. In view of the foregoing description, persons of ordinary skill in the art will be able to design appropriate masks for such applications. In an alternative embodiment, a separate luminosity mask can be provided for each CRT device.

Luminosity masks may be used to compensate for non-uniform brightness in a variety of other situations as well. For example, ambient lighting in a room may be such that one part of a display surface is in shadow while another part is brightly lit. In addition, properties of the display device, such as intensity roll-off, may cause some portions of the display surface to appear brighter or dimmer than others. Using the interfaces described above or other interfaces, a user can customize a luminosity mask to correct for such effects and/or other nonuniformities in apparent image brightness.

Figure 8A:
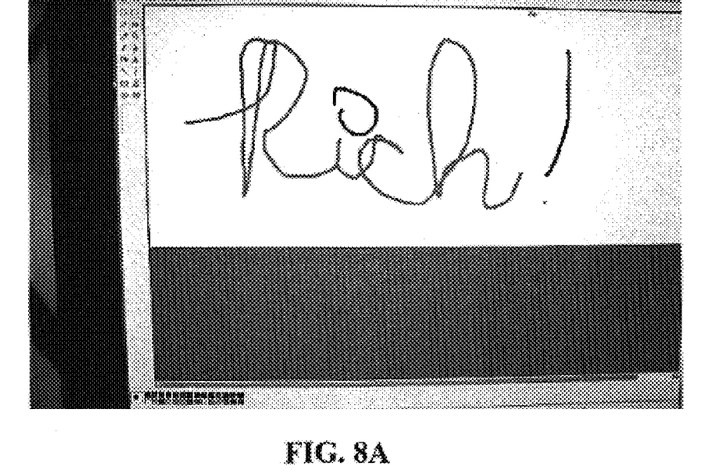
FIGS. 8A-B are screen shots showing, respectively, a luminosity mask and a corresponding displayed image according to an embodiment of the present invention.
Figure 8B:
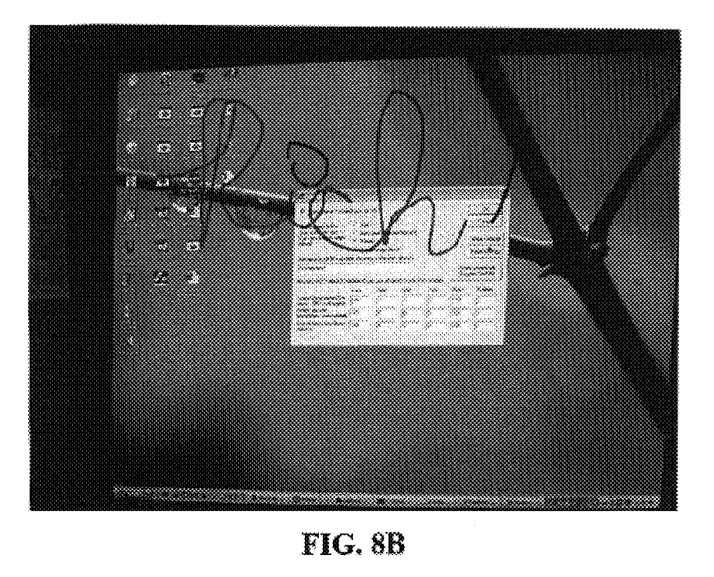

More generally, a luminosity mask can define any pattern of light and dark pixels and is not limited to smooth gradients or light and dark bands. Accordingly, in some embodiments of the present invention, luminosity masks are used to create visible patterns in a displayed image by superimposing a pattern of darker and/or brighter pixels over the underlying image. The pattern can be a design or image (e.g., a manufacturer's logo, a user's name) or any other pattern of light and dark pixels. As just one example, FIG. 8A is a screen shot of a luminosity mask defining an arbitrary design, and FIG. 8B is a screen shot of a displayed image consisting of an underlying image (a Microsoft Windows desktop) to which the mask of FIG. 8A has been applied. The design is visible in FIG. 8B, as is the desktop.

A patterned luminosity mask can also be used to provide a user interface layer that is transparent to operating system or application programs. Such an interface may be used, e.g., for adjusting display parameters or graphics card settings, or for sending informational messages (such as a low battery warning) to a user. In this embodiment, elements of the user interface (e.g., text prompts, icons, etc.) are displayed by applying a luminosity mask that significantly darkens appropriate pixels, thereby creating visible icons and/or text messages superimposed on an underlying image. In some instances, messages may also be displayed by brightening appropriate pixels, although such messages may be less visible to the user due to pixel saturation.

It should be noted that an interface layer provided by a luminosity mask can be non-disruptive. As FIG. 8B shows, the user can still see the underlying image through the patterns of light and darkness, and the appearance of menus, notices, or other elements of the mask-based interface does not affect the operating system. As just one example, a low battery warning can be displayed while a user continues typing into a word-processing program.

In some embodiments, when a luminosity-mask user interface layer is active, user input (e.g., keyboard and/or mouse events) can be intercepted and processed by the user interface layer, thereby allowing the user to clear notifications, make selections from menus, and so on. Elements of such a user interface layer can be activated in response to a user action (e.g., selection from a regular on-screen menu, activation of a designated key or key sequence, etc.) or a system condition (e.g., low battery), and deactivated in response to a subsequent user action or a change in the system condition.

In the embodiment of FIG. 1, luminosity compensation occurs within a graphics pipeline of a graphics processing subsystem. Luminosity compensation using luminosity masks as described above can also be implemented in other hardware configurations, with or without texture mapping.

Figure 9:
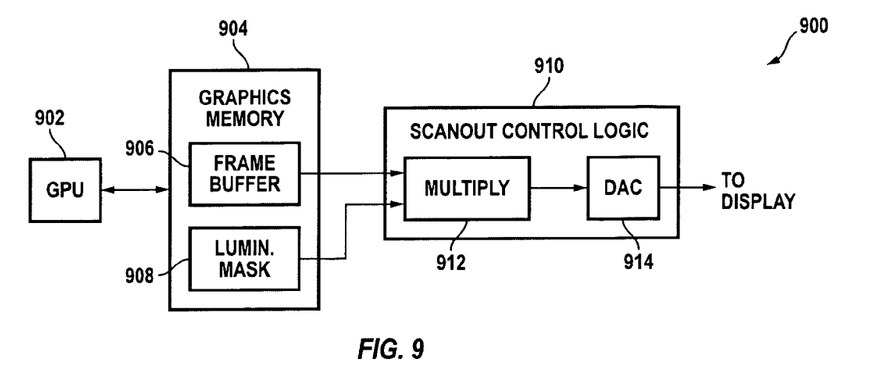
FIG. 9 is a block diagram of a graphics processing system according to an alternative embodiment of the present invention.

For example, FIG. 9 is a simplified block diagram of a graphics processing subsystem 900 that performs luminosity compensation during scanout. Graphics processing subsystem 900 includes a GPU 902, which may be generally similar to GPU 114 described above; a graphics memory 904 that includes a frame buffer 906 and a luminosity mask buffer 908; and scanout control logic 910. Scanout control logic 910 receives data for a pixel of the image from frame buffer 906 and data (e.g., a scaling factor) for a corresponding pixel of a luminosity mask 908; multiplier 912 multiplies the two values to produce a luminosity-compensated pixel value. This luminosity-compensated pixel value is provided to a digital-to-analog converter (DAC) 914 to generate an analog output signal. It will be appreciated that in alternative embodiments, scanout control logic 910 may provide the output signal as a digital signal rather than an analog signal. Conversion to analog may be done within an external display device, or the display device may control its display elements using the digital signal without conversion to analog.

Figure 10:
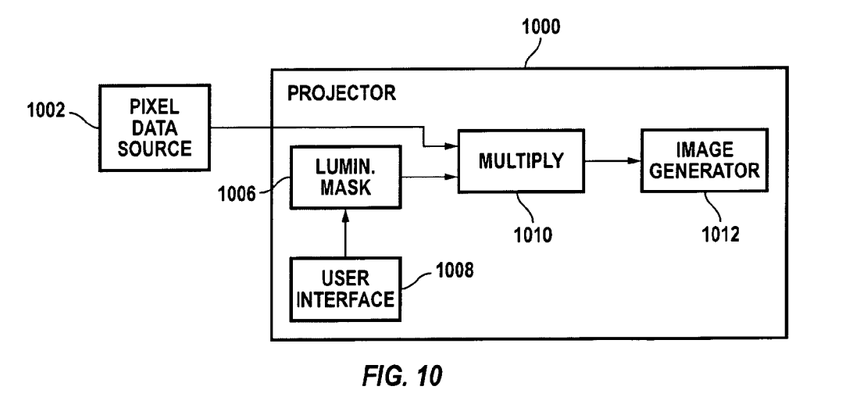
FIG. 10 is a block diagram of a projector according to an embodiment of the present invention.

FIG. 10 is a simplified block diagram of a luminosity compensation circuit 1000 that can be implemented in display device, such as a projector. Compensation circuit 1000 is coupled to a pixel data source 1002 that provides pixel data for an image to be displayed. In one embodiment, pixel data source 1002 is generally similar to computer system 100 of FIG. 1; in another embodiment, pixel data source 1002 includes a DVD player or any other device that generates pixel data for an image.

Compensation circuit 1000 receives the pixel data on an input bus 1004 and stores a luminosity mask in a memory 1006. The luminosity mask may be created and modified in response to commands received from a user interface 1008 of the display device. User interface 1008 may be implemented similarly to any of the user interfaces described above, with appropriate user input devices (e.g., keys and/or toggle switches) being provided on the projector housing and/or a remote device that communicates with the projector. For each received pixel, a corresponding pixel in luminosity mask 1006 is selected, and a multiplier 1010 multiplies the two values to produce a luminosity-compensated pixel value. This value is provided to an image generator element 1012, which may include, e.g., an LCD device, one or more lasers, a digital micro-mirror element, and so on; where appropriate, the pixel value may be converted to an analog signal to control image generator element 1012.

In an alternative embodiment, the luminosity mask is generated by an external source, such as pixel data source 1002. The mask may be supplied in advance and stored in mask memory 1006, or stored in a memory of pixel data source 1002, which may provide mask data together with pixel data.

In yet another embodiment, luminosity compensation can be performed within a computer system that does not include a graphics processing card. For example, a CPU may be programmed to perform per pixel luminosity compensation, e.g., by multiplying pixel data values by scaling factors obtained from a luminosity mask (which may be stored in system memory), or a graphics accelerator chip mounted on the motherboard may perform the luminosity compensation. Those of skill in the art will appreciate that a variety of hardware configurations can be adapted to support per-pixel luminosity compensation using texture blending techniques.

While the invention has been described with respect to specific embodiments, one skilled in the art will recognize that numerous modifications are possible. For instance, the description above refers to luminosity masks and/or luminosity textures that provide a single scaling factor per pixel (or per texel), but those of skill in the art will recognize that the invention is not limited to such masks. For instance, the luminosity mask may include separate red, green, and blue color scaling factors for adjusting the luminosity of each color component of a pixel independently. To give an image a reddish cast, green and blue components may be scaled down more than red components; to make red text appear on the screen, the red color component of appropriate pixels may be unaltered (or even increased), while green and blue components are scaled to zero. Other color effects may also be provided.

Multiple luminosity masks or textures may also be applied to an image. For instance, a mask that provides a user interface may be applied together with a mask that corrects for nonuniform illumination. In one embodiment, each mask is defined as a texture and applied at a different stage of a multi-stage texture blending module.

Luminosity masks or textures are also not limited to linear rescaling of the color value. Logarithmic or other scaling techniques may be implemented, and texture blending techniques other than modulation may also be used. The luminosity mask may also exploit other color properties, e.g., alpha transparency, to achieve a desired modification of the image brightness.

In addition, while the invention has been described with reference to programs executing on programmable devices, it is to be understood that the systems and processes of the present invention may also be implemented using dedicated hardware components, software executing on programmable devices, or any combination thereof. Computer programs embodying aspects of the present invention may be stored or transmitted on various media, including magnetic disks, optical storage media, flash memory, and carrier signals for transmission via wired, optical, and/or wireless networks.

Thus, although the invention has been described with respect to specific embodiments, it will be appreciated that the invention is intended to cover all modifications and equivalents within the scope of the following claims.

What is claimed is:

1. A computer-implemented method for generating a luminosity compensated image, the method comprising:
    defining a luminosity texture having a plurality of luminosity texels;
    converting pixel data for an underlying image to an image texture having a plurality of image texels;
    blending the image texture onto a target surface having a shape;
    blending the luminosity texture onto the target surface, thereby generating luminosity compensated pixel data for the image that is stored in the computer;
    providing a user interface enabling a user to modify the shape of the target surface, wherein defining the luminosity texture includes automatically updating one or more of the luminosity texels in response to a user modification of the shape of the target surface.

2. The method of claim 1, wherein the target surface comprises a polygon having a plurality of vertices, at least one of the vertices being associated with one of the image texels of the image texture.

3. The method of claim 2, wherein the user interface comprises a handle for repositioning a vertex of the polygon.

4. The method of claim 1, further comprising:
    providing the luminosity compensated pixel data to a display device.

5. The method of claim 4, wherein providing the luminosity compensated pixel data to the display device includes:
    storing the luminosity compensated pixel data in a frame buffer; and
    subsequently scanning out the frame buffer data, thereby providing data to the display device.

6. The method of claim 1, wherein each luminosity texel includes a scaling factor.

7. The method of claim 6, wherein blending the luminosity texture onto the target surface includes:
    selecting one of the luminosity texels; and
    multiplying a pixel value from the target surface by the scaling factor of the selected luminosity texel.

8. The method of claim 6, wherein the scaling factors define a luminosity gradient to be applied across an area of the image.

9. The method of claim 1, wherein automatically updating one or more of the luminosity texels includes computing a luminosity scaling factor based on a distance to a location on the target surface that maps to the texel.

10. The method of claim 9, wherein the distance is determined from a depth coordinate of the location on the target surface.

11. The method of claim 1, wherein the luminosity texture includes a low luminosity region.

12. The method of claim 11, wherein the low luminosity region corresponds to an overlap region in an image to be displayed using a plurality of display devices configured to display overlapping image elements.

13. The method of claim 1, wherein the luminosity texture includes dark texels for forming a visible pattern superimposed on the underlying image.

14. The method of claim 13, wherein the visible pattern corresponds to a textual message readable by a user.

15. The method of claim 1, further comprising:
    providing a user interface enabling a user to define the luminosity texture.

16. The method of claim 15, wherein the user interface further enables the user to save the luminosity texture to a file.

17. The method of claim 16, wherein the user interface further enables the user to select a previously saved luminosity texture file to be applied.

18. The method of claim 15, wherein the user interface further enables the user to modify the luminosity texture.

19. The method of claim 1, wherein each luminosity texel includes an independent scaling factor for each of a plurality of color components.

20. The method of claim 19, wherein the plurality of color components includes a red component, a green component, and a blue component.

21. The method of claim 1, wherein the updated luminosity texels provide a second image with a more uniform brightness from one edge of the second image to another edge of the second image.

22. A graphics processing system comprising:
    a texture generation module configured to convert pixel data for an underlying image to an image texture having a plurality of image texels;
    a texture memory configured to store the underlying image texture and a luminosity texture having a plurality of luminosity texels;
    a multistage texture blending module configured to blend each of the image texture and the luminosity texture onto a target surface having a shape, thereby generating luminosity-compensated pixel data for an image;
    a user interface module configured to receive a user instruction modifying the shape of the target surface; and
    a luminosity compensation module configured to automatically update the luminosity texture stored in the texture memory in response to the user instruction modifying the shape of the target surface.

23. The graphics processing system of claim 22, wherein the target surface comprises a polygon having a plurality of vertices, at least one of the vertices being associated with a texture coordinate of the image texture.

24. The graphics processing system of claim 23, wherein the user interface module is configured to receive a repositioning of at least one vertex of the polygon.

25. The graphics processing system of claim 22, further comprising a frame buffer configured to store the luminosity-compensated pixel data.

26. The graphics processing system of claim 22, further comprising scanout control logic configured to provide the luminosity-compensated pixel data to a display device.

27. The graphics processing system of claim 22, wherein each luminosity texel includes a scaling factor.

28. The graphics processing system of claim 22, wherein the luminosity compensation module is further configured to compute an updated value for a texel of the luminosity texture based on a distance to a location on the target surface that maps to the texel.

29. The graphics processing system of claim 28, wherein the distance is determined from a depth coordinate of the location on the target surface.

30. The graphics processing system of claim 22, wherein the luminosity texture includes a low luminosity region.

31. The graphics processing system of claim 30, wherein the low luminosity region corresponds to an overlap region in an image to be displayed using a plurality of display devices configured to display overlapping image elements.

32. The graphics processing system of claim 22, wherein the luminosity texture includes darkened texels forming a visible pattern.

33. The graphics processing system of claim 32, wherein the pattern corresponds to a textual message readable by a user.

34. The graphics processing system of claim 22, further comprising a user interface module configured to enable a user to define the luminosity texture.

35. The graphics processing system of claim 22, wherein the updated luminosity texture provides a second image with a more uniform brightness from one edge of the second image to another edge of the second image.

36. A computer readable medium encoded with program code for controlling operation of a computer system to generate a luminosity compensated image, the program code including:
   program code for defining a luminosity texture that includes a scaling factor for each of a plurality of luminosity texels;
   program code for converting pixel color values of an underlying image to an image texture having a plurality of image texels;
   program code for blending the image texture onto a surface having a shape;
   program code for blending the luminosity texture onto the target surface, thereby generating luminosity compensated pixel data for the image;
   program code for providing a user interface enabling a user to modify the shape of the target surface; and
   program code for updating the scaling factor for each luminosity texel based on the modified shape of the target surface.

37. The computer readable medium of claim 36, wherein the computer readable medium comprises a magnetic storage medium encoded with the program code.

38. The computer readable medium of claim 36, wherein the computer readable medium comprises an optical storage medium encoded with the program code.

39. The computer readable medium of claim 36, wherein the program code further includes program code for providing a user interface enabling a user to define the luminosity texture.

40. The computer readable medium of claim 36, wherein the updated luminosity texels provide a second image with a more uniform brightness from one edge of the second image to another edge of the second image.

* * * * *